(12) United States Patent
Melville

(10) Patent No.: US 6,220,711 B1
(45) Date of Patent: Apr. 24, 2001

(54) AUGMENTED IMAGING USING A SILHOUETTE TO IMPROVE CONTRAST

(75) Inventor: Charles D. Melville, Issaquah, WA (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 09/189,738

(22) Filed: Nov. 10, 1998

Related U.S. Application Data

(63) Continuation of application No. 09/009,759, filed on Jan. 20, 1998, now Pat. No. 5,913,591.

(51) Int. Cl.⁷ .............................. G03B 21/14; G02B 27/10
(52) U.S. Cl. ................................. 353/28; 345/9; 359/630
(58) Field of Search ........................... 353/28, 30, 122; 345/7, 8, 9; 359/618, 629, 630

(56) References Cited

U.S. PATENT DOCUMENTS

| | | |
|---|---|---|
| 5,526,184 * | 6/1996 | Tokuhashi et al. ................. 359/630 |
| 5,546,099 | 8/1996 | Quint et al. . |
| 5,625,493 * | 4/1997 | Matsumura et al. ................. 359/630 |
| 5,712,649 * | 1/1998 | Tosaki ...................................... 345/8 |
| 5,726,806 * | 3/1998 | Holden et al. ....................... 359/630 |
| 5,742,262 * | 4/1998 | Tabata et al. ............................ 345/8 |
| 5,913,591 * | 6/1999 | Melville ................................. 353/28 |

\* cited by examiner

*Primary Examiner*—William Dowling
(74) *Attorney, Agent, or Firm*—Steven P. Koda, Esq.

(57) ABSTRACT

An augmented display includes an image display source and a silhouette display source. The image display source generates a virtual image to be perceived by a viewer. The silhouette display source occurs in the path of the background light. The silhouette display source generates a mask corresponding to the image content of the image display. The mask is a darkened area reducing or blocking background light. As the light from the virtual image is overlaid onto the background, there is less background light in the portion where the image appears.

38 Claims, 4 Drawing Sheets

AUGMENTED IMAGING USING A SILHOUETTE TO IMPROVE CONTRAST

CROSS REFERENCE TO RELATED APPLICATIONS

This is a continuation of U.S. patent application Ser. No. 09/009,759 filed Jan. 20, 1998 and now U.S. Pat. No. 5,913,591 for Augmented Imaging Using a Silhouette to Improve Contrast. The content of that application is incorporated herein by reference and made a part hereof.

BACKGROUND OF THE INVENTION

This invention relates to augmented imaging techniques and augmented displays.

An augmented display is a see-through display which overlays an image onto a background. The overlaid image is a virtual image. The background is a real world view of the ambient environment. The overall image is formed by adding light to the background. The added light corresponds to the virtual image. The virtual image appears to be transparent because in the display portion where the image is formed, light from both the virtual image and the background impinge on the same photoreceptors in the viewer's eye. Because light from both light sources impinge on the same photoreceptors, it may be difficult for the viewer to distinguish between the image and the background. This invention is directed toward a method and apparatus for improving the contrast of an augmented display.

SUMMARY OF THE INVENTION

According to the invention, an augmented display includes an image display source and a silhouette display source. The image display source generates a luminous virtual image to be perceived by a viewer. The silhouette display source occurs in the path of the background light.

According to one aspect of this invention, the silhouette display source generates a mask corresponding to the image content of the image display. The mask is a darkened area reducing or blocking background light. As the light from the virtual image is overlaid onto the background, there is less background light in the portion where the image appears. In one embodiment the mask shape and size is the same as the virtual image content created by the image display. In effect, the mask is a dark version of the virtual image content. In another embodiment the mask encompasses more area than just the image area of the virtual image.

An advantage of using a silhouette mask is that the content of the virtual image appears to be solid, rather than transparent. The virtual image overlays and eclipses the background objects.

According to another aspect of the invention, in a telescope embodiment the silhouette display source is located at the intermediate image plane of the telescope. An advantage of locating the silhouette display source at the intermediate image plane is that the darkened silhouette is in focus. There is a sharp edge between the background and the silhouette mask. Another advantage is that the virtual image appears more real when the mask is in focus.

These and other aspects and advantages of the invention will be better understood by reference to the following detailed description taken in conjunction with the accompanying drawings.

DESCRIPTION OF SPECIFIC EMBODIMENTS

Overview

Figure 1:
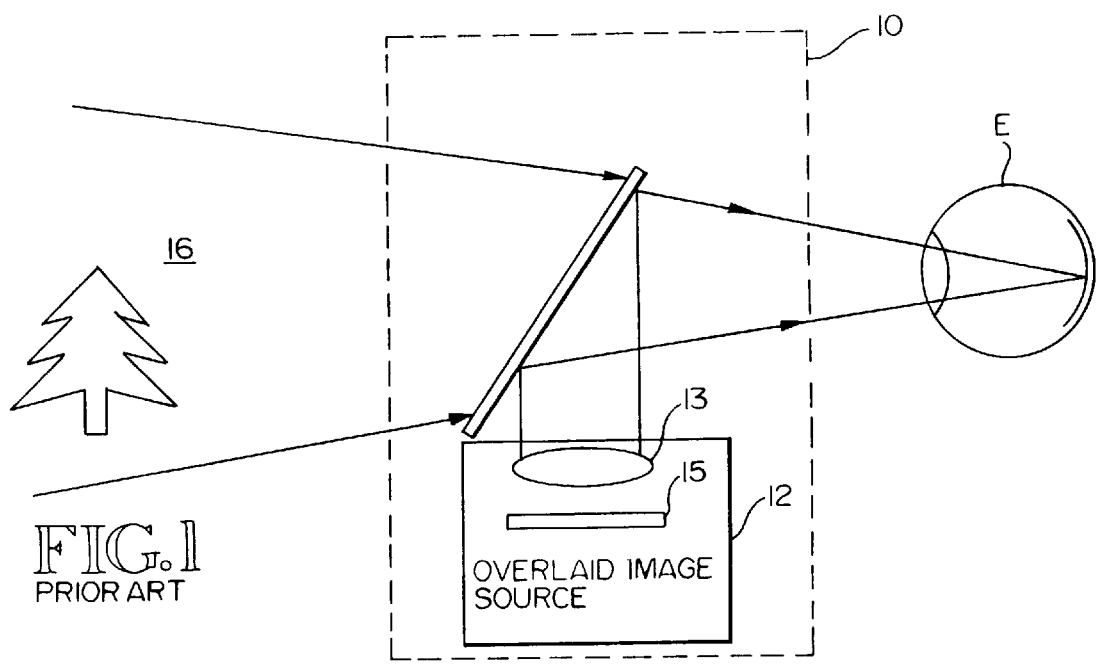
FIG. 1 is a block diagram of a conventional augmented display.

FIG. 1 shows a block diagram of a conventional augmented display apparatus 10. The display apparatus 10 includes a generated image source 12 and a beamsplitter 14. The image source 12 includes a lens 13 and an image plane generator 15. Light is received at the beamsplitter 14 from the image source 12 and from the outside ambient environment 16. The light from each passes through the beamsplitter and reaches a viewer's eye E. In effect the image generated by the image source 12 is overlaid onto the background view of the ambient environment.

Figure 2:
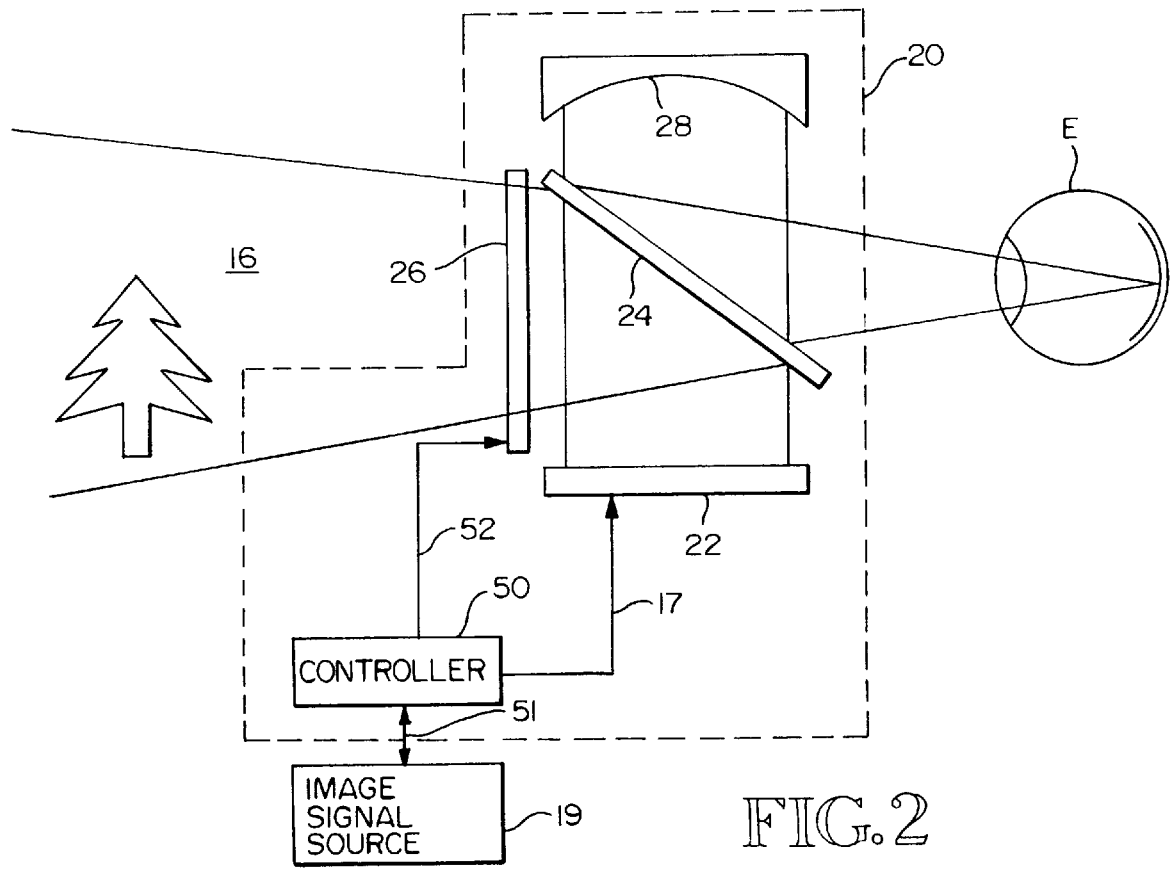
FIG. 2 is an optical schematic of an augmented display according to one embodiment of this invention.

FIG. 2 shows an optical schematic diagram of an augmented display 20 according to an embodiment of this invention. The display 20 includes a virtual image display 22, a silhouette display 26, a controller 50, a beamsplitter 24 and a mirror 28. The display 20 receives an image signal 51, such as an RGB signal, NTSC signal, VGA signal or other formatted color or monochrome video or image data signal, from an image signal source 19. A virtual image signal 17 and a silhouette image signal 52 are derived from the image signal 51 at the controller 50. The virtual image signal 17 is input to the virtual image display 22 which in response generates light for forming a virtual image. The silhouette image signal 52 is input to a silhouette display 26 which in response generates a silhouette image. The virtual image display 22 is a flat panel display, CRT monitor, or virtual retinal display. Light defining a virtual image is emitted from the virtual image display 22 and passes through the beamsplitter 24 before impinging on the viewer's eye E. The silhouette display 26 is a liquid crystal display panel or another transparent display device which passes background light from the ambient environment. Background light 16 passes through the silhouette display 26 and beamsplitter 24, then impinges on the viewer's eye E. The concave mirror 28 receives some of the virtual image light from the beamsplitter. The mirror 28 reflects such light back into the beamsplitter and on to the viewer's eye E to increase the amount of light reaching the eye E. The mirror acts like a lens to locate the virtual image at the same apparent distance as the real image.

Figure 3:
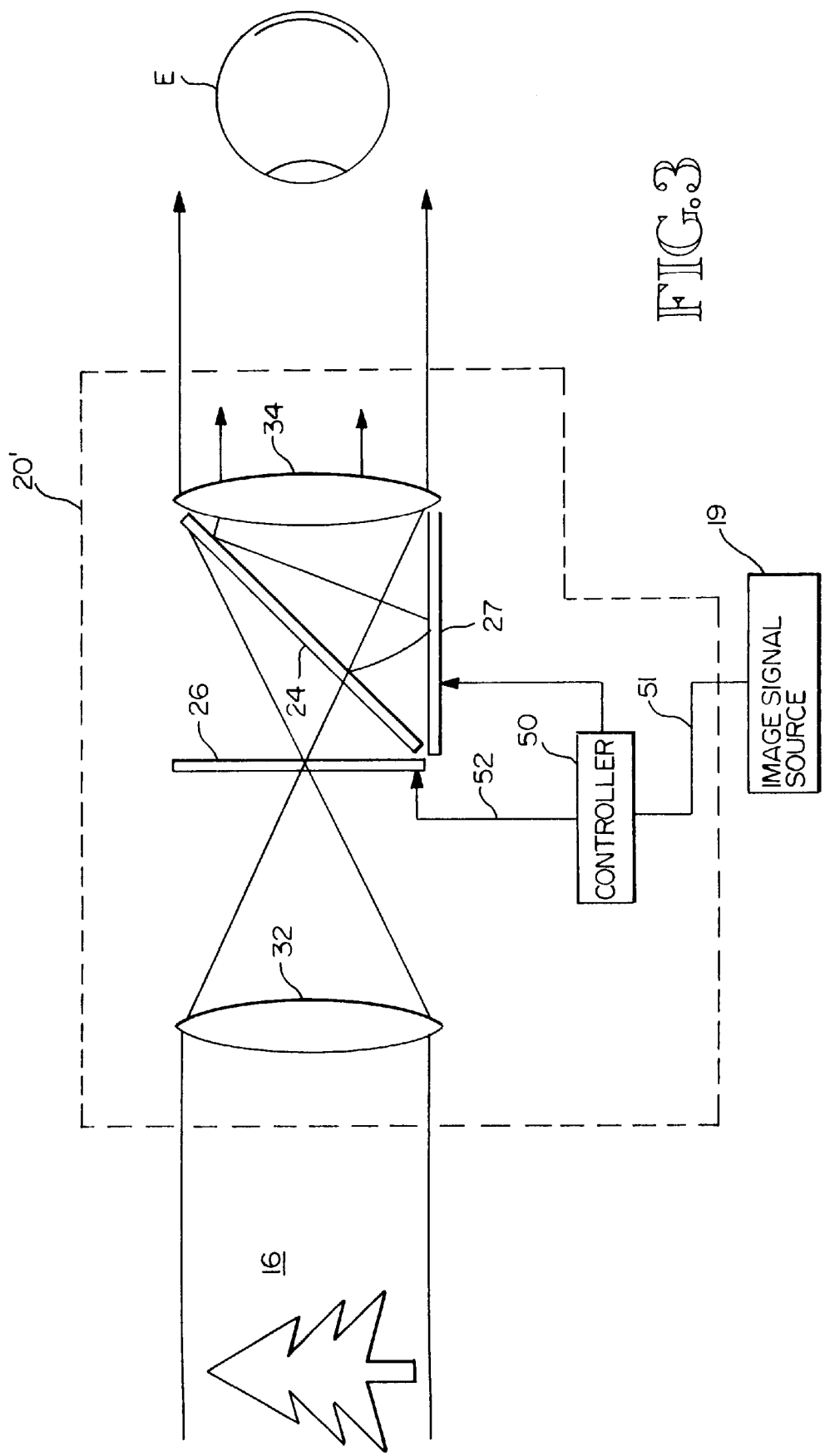
FIG. 3 is an optical schematic of an augmented display according to another embodiment of this invention.

FIG. 3 shows an alternative embodiment of an augmented display 20'. Components serving a similar function as in display 20 are given the same part numbers. The display 20' includes a virtual image source 22, such as a flat panel display, CRT monitor, or virtual retinal display. In addition, the display 20' includes a beamsplitter 24, a silhouette display 26, an objective lens 32, an eyepiece 34 and a controller 50. Background light passes through the objective lens 32 and is focused to an intermediate image plane which is concurrent with the silhouette display 26. The silhouette display 26 is normally transparent and passes the focused background light. The background light passes through the silhouette display 26, beamsplitter 24, and an eyepiece 34, then impinges on the viewer's eye E. Light defining a virtual image is emitted from the virtual image source 22 and passed through the beamsplitter 24 and eyepiece 34 before impinging on the viewer's eye E.

Operation

Figure 4:
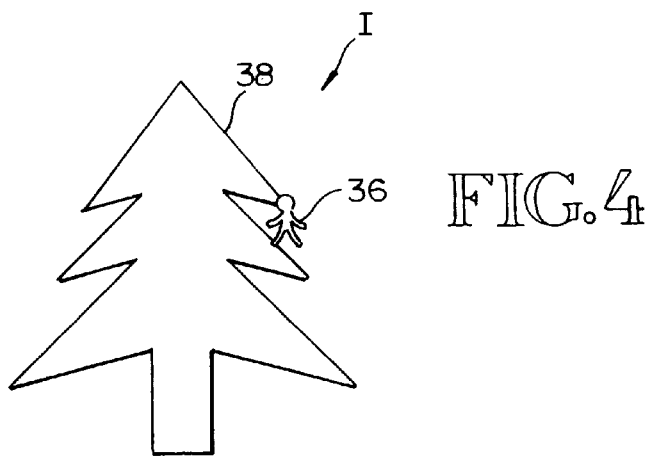
FIG. 4 is a diagram of an image generated by the display of FIG. 1.
Figure 5:
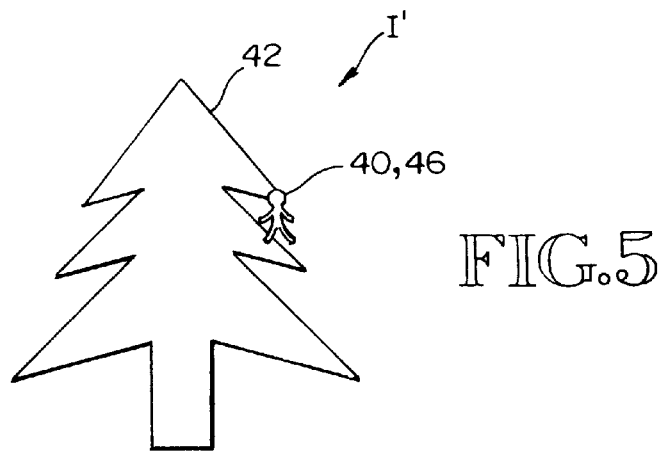
FIG. 5 is a diagram of an image generated by the display of FIGS. 2 or 3 according to an embodiment of this invention.

FIG. 4 shows an image I perceived by a viewer for the conventional display 10 of FIG. 1. An image 36 is overlaid onto a background image 38. Note that the overlaid image 36 is transparent. FIG. 5 shows an image I' perceived by a viewer for the displays 20 or 20' of FIGS. 2 and 3 according to this invention. Although the same image I' is depicted for each display 20, 20', in practice the image from display 20 will have a fuzzy, out of focus dark area around the overlaid image I'. The image I' from display 20' will have a sharper, in focus border at the overlaid image I'.

Figure 6:
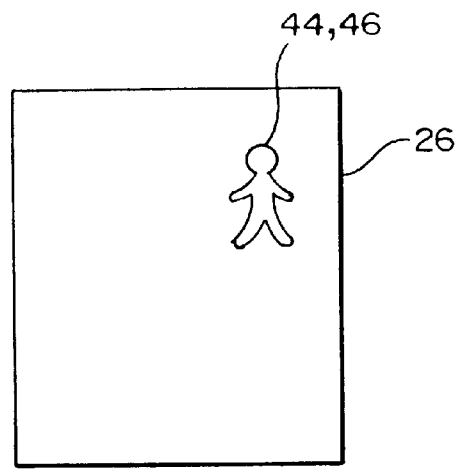
FIG. 6 is a diagram of the silhouette display 26 of FIGS. 2 or 3 with a masked region shown according to an embodiment of this invention.

A virtual image 40 is generated by the virtual image display 22. Concurrently a background image 42 formed by background light from the ambient environment is passed through the silhouette display 26. In effect the virtual image 40 is overlaid onto the background image 42. According to one aspect of this invention, the silhouette display 26 is darkened within a select region 44 (see FIG. 6) to reduce or preclude background light from passing through such select region 44. Such select region 44 corresponds to the virtual image 40 and serves as a mask 46. In one embodiment the mask 46 coincides with the virtual image 40 (see FIG. 5). In another embodiment the mask 46 encompasses more area than just the virtual image 40 (see FIGS. 7 and 8).

To define the virtual image 40, the virtual image display 22 receives image data signals 51 from a computer or other signal source 19. In one embodiment a controller 50 for the silhouette display 26 also receives such image data signals 51. In response the controller 50 generates a masking signal 52 which darkens a select region 44 of the silhouette display 26 to define the corresponding mask 46. In one embodiment a pixel to pixel mask 46 (see FIG. 6) is generated, in which for each pixel of the virtual image 40 there is a corresponding pixel darkened in the silhouette display 26. In another embodiment, in addition to pixel to pixel masking, additional pixels on the silhouette display 26 are darkened to mask other portions within or around the virtual image 40 (see FIG. 8).

Figure 7:
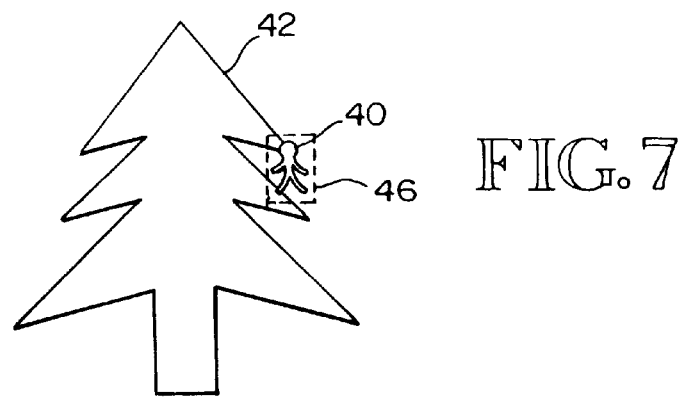
FIG. 7 is a diagram of an image generated by the display of FIGS. 2 or 3 according to an embodiment of this invention.
Figure 8:
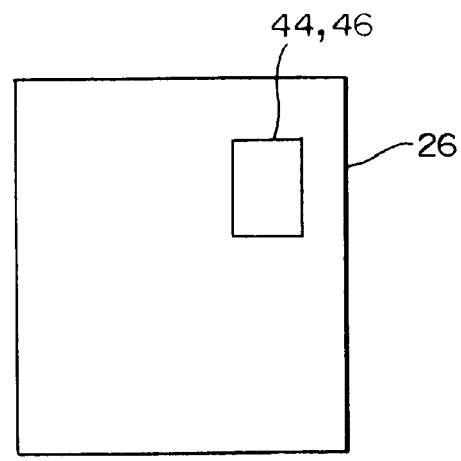
FIG. 8 is a diagram of the silhouette display 26 of FIGS. 2 or 3 with an alternative masked region shown according to an embodiment of this invention.

Although the images shown in FIGS. 5 and 7 include only one virtual image 40 and one mask 46, in alternative embodiments there are multiple images 40 and masks 46 viewable at a given time. Similarly, although only one mask is shown in each of FIGS. 6 and 8, in alternative embodiments multiple darkened regions 44 and masks 46 are formed.

In one embodiment the silhouette display 26 has the same pixel resolution as the virtual image source display 22. In another embodiment the silhouette display 26 has a differing resolution (e.g., lower or higher resolution) than the virtual image display 22. For varying resolution, the mapping of the virtual image 40 to the mask 46 differs than one pixel to one pixel. For every pixel of the virtual image display 22, there is at least one pixel of the silhouette display 26 which is darkened. However, the pixel darkened for the silhouette display 26 may encompass one or more pixels of the image display 22 (e.g., where silhouette display 26 has lower resolution than the virtual image display 22). According to one embodiment the silhouette display 26 is formed by a transparent liquid crystal display ('LCD') panel. The LCD panel is addressable to pixel precision. When a pixel is activated the region of the pixel on the panel darkens reducing or precluding background light from passing.

Although the controller 50 is shown to receive the image data signal 51, in an alternative embodiment the processor generating the image data signal 51 for the display 22 also serves as the controller for generating the masking signal 52.

Virtual Retinal Display

Figure 9:
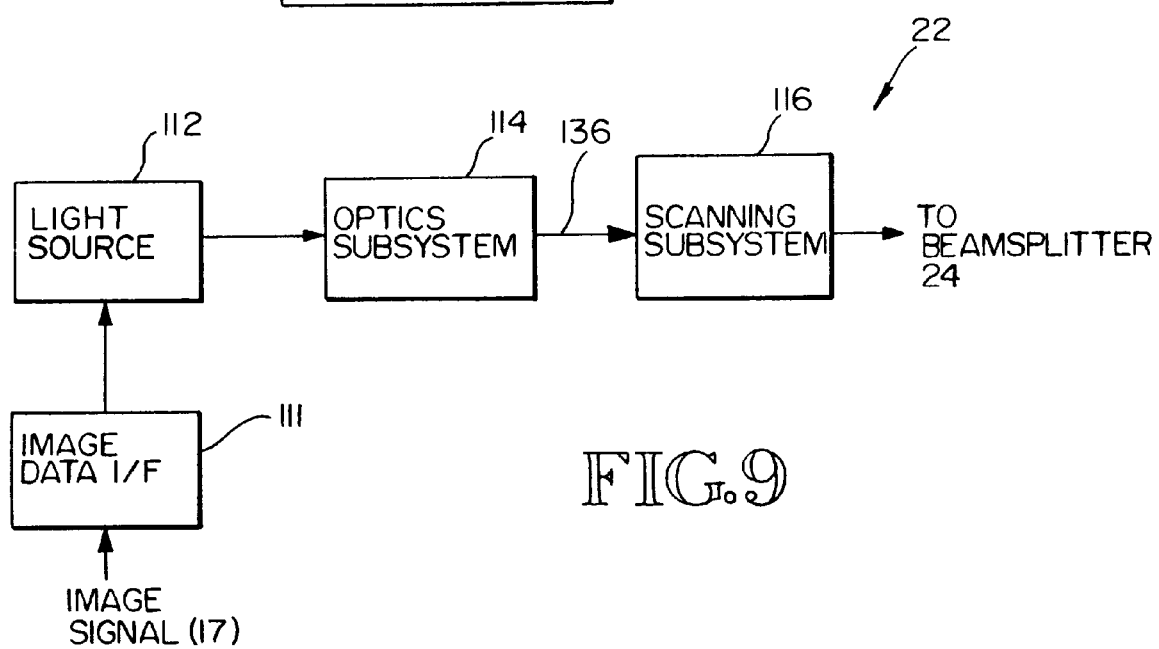
FIG. 9 is an optical schematic of a virtual retinal display embodiment of the virtual image source of FIGS. 2 and 3.

FIG. 9 is a block diagram of a virtual retinal display 22 which generates and manipulates light to create color or monochrome images having narrow to panoramic fields of view and low to high resolutions. The display 22 includes an image data interface 111 which receives a virtual image signal 17 from the controller 50 (see FIGS. 2 or 3). The image data interface 111 generates signals for controlling a light source 112. Light modulated with video information corresponds to image elements (e.g., image pixels) which are scanned onto the retina of a viewer's eye E to produce the perception of an erect virtual image.

The virtual image signal 17 is a video or other image signal, such as an RGB signal, NTSC signal, VGA signal or other formatted color or monochrome video or graphics signal. An exemplary embodiment of the image data interface 111 extracts color component signals and synchronization 'SYNCH' signals from the received image signal. In an embodiment in which an image signal has embedded red, green and blue components, the red signal is extracted and routed to a modulator for modulating a red light point source output. Similarly, the green signal is extracted and routed to a modulator for modulating the green light point source output. Also, the blue signal is extracted and routed to a modulator for modulating the blue light point source output.

The light source 112 includes one or more point sources of light. For generating a monochrome image a single monochrome emitter typically is used. For color imaging, multiple light emitters (e.g., red light point source, green light point source, and blue light point source) are used. Preferably the emitted light is spatially coherent. Exemplary light emitters include colored lasers, laser diodes or light emitting diodes (LEDs). Although LEDs typically do not output coherent light, lenses are used in one embodiment to shrink the apparent size of the LED light source and achieve flatter wave fronts. In a preferred LED embodiment a single mode monofilament optical fiber receives the LED output to define a point source which outputs light approximating coherent light.

Where the light emitters are externally modulated, the display device 22 also includes a modulator responsive to an image data signal received from the image data interface 111. The modulator modulates the visible light emitted by the light emitters to define image content for the virtual imagery scanned on a viewer's eye. The modulator is an acoustooptic, electrooptic, or micro-electromechanical modulator. Additional detail on these and other light source 112 embodiments are found in U.S. patent application Ser. No. 08/437,818 for "Virtual Retinal Display with Fiber Optic Point Source" filed May 9, 1995, and incorporated herein by reference. According to alternative embodiments, the light emitters or the light generated by the point sources are modulated to include red, green, and/or blue components at a given point (e.g., pixel) of a resulting image. Respective beams of the point sources are modulated to introduce color components at a given pixel.

The optics subsystem 114 receives the light output from the light source 112, either directly or after passing through the scanning subsystem 116. In some embodiments the optical subsystem collimates the light. In another embodiment the optics subsystem converges the light. Left undisturbed the light converges to a focal point then diverges beyond such point. As the converging light is deflected, however, the focal point is deflected. The pattern of deflection defines a pattern of focal points. Such pattern is referred to as an intermediate image plane.

The emitted light 136 is deflected along a prescribed pattern, such as a raster pattern, by a scanner subsystem 116. In an alternative embodiment another display format such as vector imaging can be used for scanning image elements onto the eye. In one embodiment the scanning subsystem 116 receives a horizontal deflection signal and a vertical deflection signal derived from the image data interface 111. The scanning subsystem 116 is located after the light source 112, either before or after the optics subsystem 114. In one embodiment the scanning subsystem 116 includes a resonant scanner for performing horizontal beam deflection and a galvanometer for performing vertical beam deflection. The horizontal scanner receives a drive signal having a frequency defined by the horizontal synchronization signal extracted at the image data interface 111. Similarly, the galvanometer serving as the vertical scanner receives a drive signal having a frequency defined by the vertical synchronization signal VSYNC extracted at the image data interface 111. Preferably, the horizontal scanner has a resonant frequency corresponding to the horizontal scanning frequency. In alternative embodiments, the scanning subsystem 116 instead includes acousto-optical deflectors, electro-optical deflectors, rotating polygons or galvanometers to perform the horizontal or vertical light deflection. In some embodiments, two of the same type of scanning device are used. In other embodiments different types of scanning devices are used for the horizontal scanner and the vertical scanner.

The light emitted from the display 22 is deflected by the beamsplitter 24 (see FIGS. 2 and 3) and directed toward a viewer's eye E. In the embodiment of FIG. 3 an eyepiece 34 also is included.

Meritorious and Advantageous Effects

An advantage of using a silhouette mask is that the content of the virtual image appears to be solid, rather than transparent. The virtual image overlays and eclipses the background objects. An advantage of locating the silhouette display source at the image plane is that the darkened silhouette is in focus. There is a sharp edge between the background and the silhouette mask. Another advantage is that the virtual image appears more real when the mask is in focus.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. An apparatus for displaying to a viewer's eye a selected image against a source of background light in response to an image signal, the viewer's eye having a field of view, comprising:

a scanning display oriented to emit a light beam along a first set of optical paths toward the viewer's eye and responsive to the image signal to produce a first image aligned with the background light; and an electronically controllable barrier including a plurality of selectively actuatable pixels positioned in a second set of respective optical paths extending between the source of background light and the viewer's eye, each of the selectively actuatable pixels being responsive to a respective electronic signal to attenuate a respective portion of the background light along the respective optical path, wherein the first and second sets of optical paths pass through a common region of the viewer's field of view.

2. The apparatus of claim 1 wherein the scanning display has a resolution sufficient to display the image with a first number of pixels different from the number of pixels in the plurality of selectively actuatable pixels.

3. The apparatus of claim 1 wherein each of the pixels is substantially opaque when activated.

4. The apparatus of claim 1 wherein the electronically controllable barrier includes an LCD array.

5. The apparatus of claim 1 further comprising an electronic controller responsive to the image signal to activate both the scanning display and the barrier.

6. The apparatus of claim 1 wherein the scanning display includes a light source responsive to the image signal to produce a temporally modulated beam of light and a scanning assembly oriented to receive the modulated beam of light and operative to scan the received modulated beam of light through a predetermined scanning pattern.

7. The apparatus of claim 6 wherein the predetermined scanning pattern is a substantially raster pattern.

8. The apparatus of claim 6 wherein the electronically controllable barrier is positioned between the background and the scanning assembly.

9. The apparatus of claim 6 wherein the scanning assembly includes a resonant scanner.

10. The apparatus of claim 9 wherein the scanning assembly includes a second scanner separate from the resonant scanner.

11. A method of displaying an augmented image, comprising:

emitting a first portion of light having a modulation corresponding to a primary image;

transmitting the emitted first portion of light along a primary optical path toward a viewing location;

generating a masking signal;

spatially modulating a first area and a second area of background light from a background responsive to the masking signal, wherein the masking signal modulates the first area in a first manner and modulates the second area in a second manner different than the first manner; and transmitting the spatially modulated light along the primary optical path toward the viewing location simultaneously with the first portion of light.

12. The method of claim 11 wherein the step of spatially modulating background light includes the steps of:

positioning an LCD array between the background and the viewing location; and selectively activating the LCD array.

13. The method of claim 12 wherein the step of selectively activating the LCD array includes the steps of:

identifying a position of a portion of the primary image;

selecting pixels of the LCD array in response to the identified position of the portion; and activating the selected pixels.

14. The method of claim 13 wherein the step of selecting pixels of the LCD array in response to the identified position of the portion includes:

identifying pixels of the LCD array that overlap the identified position, as viewed from the viewing location; and selecting the pixels from only the identified pixels.

15. The method of claim 13 wherein the step of selecting pixels of the LCD array in response to the identified position of the portion includes:

identifying pixels of the LCD array that overlap the identified position, as viewed from the viewing location;

selecting a first portion of the pixels to activate from the identified pixels; and selecting a second portion of the pixels to activate from pixels that were not identified.

16. The method of claim 13 wherein the step of selecting pixels of the LCD array in response to the identified position of the portion includes:

identifying a first set of pixels of the LCD array that overlap the identified position, as viewed from the viewing location;

identifying a second set of pixels of the LCD array that surround the identified first set of pixels; and selecting the pixels to activate from the second set of pixels.

17. A method of displaying an augmented image, comprising:

emitting a first portion of light having a modulation corresponding to a primary image;

transmitting the emitted first portion of light along a primary optical path toward a viewing location;

generating a masking signal;

spatially modulating background light from a background responsive to the masking signal; and transmitting the spatially modulated light along the primary optical path toward the viewing location simultaneously with the first portion of light;

wherein the step of emitting a first portion of light having a modulation corresponding to a primary image includes modulating the emitted light with a first resolution and the step of spatially modulating background light from a background responsive to the masking signal includes modulating the background light with a second resolution different from the first resolution.

18. The method of claim 17 wherein the first resolution is higher than the second resolution.

19. The method of claim 11 wherein the step of spatially modulating background light from a background responsive to the masking signal includes blocking substantially all background light from passing through selected spatial locations.

20. The method of claim 11 wherein the step of emitting a first portion of light having a modulation corresponding to a primary image includes temporally modulating the emitted light further comprising scanning the modulated light through a periodic pattern.

21. The method of claim 20 wherein the step of scanning the modulated light through a periodic pattern includes scanning a mirror through a selected pattern.

22. An apparatus for presenting a composite image visible at an image location including a first image and second overlapped image portions, comprising:

a first image source having a first resolution, the first image source being positioned to produce the first image portion at the image location; and a second image source having a second resolution, the second image source being positioned in an optical path between a source of background light and the image location, the second image source being in the optical path of a first spatial area of the background light, the second image source being configured to transmit in a first manner a selected spatial portion of the first spatial area of the background light toward the image location to produce the second image portion, the selected spatial portion being less than the first spatial area, the second image source being configured to modulate in a second manner a nonselected spatial portion of the first spatial area of background light, the second manner different than the first manner.

23. The apparatus of claim 22 wherein the first image source is a scanned display.

24. The apparatus of claim 23 wherein the second image source includes an LCD panel.

25. The apparatus of claim 22 wherein the source of background light is an external environment.

26. The apparatus of claim 22 wherein the first resolution is higher than the second resolution.

27. The apparatus of claim 22 further comprising an optical image combiner having a first input aligned to receive the first image portion from the first image source, a second input aligned to receive background light, and an output aligned to the image location.

28. The apparatus of claim 27 wherein the image combiner is positioned between the second image source and the image location.

29. The apparatus of claim 22 wherein the second image source includes an LCD panel.

30. The apparatus of claim 22 further comprising:

an electronic controller coupled to the first and second image sources, the electronic controller being responsive to an image signal to provide a first signal to the first image source to define the first image portion and to provide a second signal to the second image source to define the second image portion.

31. The apparatus of claim 30 wherein the first image portion includes a selected item of image information, wherein the electronic controller is responsive to the image signal to selectively activate a region of the second image source aligned to the selected item of image information differently from another region of the second image source.

32. An optical apparatus, comprising:

a source of scanned light oriented to emit the scanned light along a first optical path;

a source of background light;

a two dimensional spatial light modulator positioned to receive the background light and responsive to an electrical control signal to spatially modulate the background light of a first area in a first manner and of a second area in a second manner different than the first manner, the spatial light modulator being oriented to transmit the spatially modulated background light from either one or both of the first area and the second area of the background light along a second optical path; and a beam combiner having a first input positioned in the first optical path, a second input positioned in the second optical path, and an output port, the beam combiner being configured to emit both the scanned light from the source of scanned light and the spatially modulated background light at the output port.

33. The apparatus of claim 32 wherein the spatial light modulator includes an LCD panel.

34. The apparatus of claim 33 wherein the source of scanned light includes:

a light emitter; and a scanner.

35. The apparatus of claim 34 wherein the scanner includes a mirror oriented to recieve light from the light emitter and configured to pivot through a selected pattern.

36. The apparatus of claim 35 wherein the scanner is a resonant device.

37. The apparatus of claim 35 wherein the selected pattern is a periodic pattern.

38. The apparatus of claim 32 further comprising an electronic controller electrically coupled to both of the source of scanned light and the spatial light modulator.

* * * * *